United States Patent [19]

Bendig et al.

[11] 4,257,380
[45] Mar. 24, 1981

[54] ONE-WAY THROTTLING VALVE FOR PNEUMATIC MEMBRANE ACTUATOR IN ENGINE AIR INTAKE SYSTEM

[75] Inventors: Lothar Bendig, Ludwigsburg; Richard Hoferer, Bissingen, both of Fed. Rep. of Germany

[73] Assignee: Filterwerk Mann & Hummel GmbH, Ludwigsburg, Fed. Rep. of Germany

[21] Appl. No.: 37,997

[22] Filed: May 9, 1979

[30] Foreign Application Priority Data

May 18, 1978 [DE] Fed. Rep. of Germany ....... 2821649

[51] Int. Cl.³ ............................................. F02M 31/00
[52] U.S. Cl. ..................................... 123/552; 123/556
[58] Field of Search .......... 123/122 D, 122 R, 122 H, 123/543, 556, 552; 236/13

[56] References Cited

U.S. PATENT DOCUMENTS

| 3,459,163 | 8/1969 | Lewis | 123/122 D |
| 3,726,512 | 4/1973 | Herwig | 123/122 D |
| 3,913,544 | 10/1975 | Fyie | 123/122 D |
| 3,918,421 | 11/1975 | Berry | 123/122 H |
| 4,175,524 | 11/1979 | Coddington | 123/122 D |
| 4,178,898 | 12/1979 | Akado | 123/122 D |

*Primary Examiner*—Ronald H. Lazarus
*Attorney, Agent, or Firm*—Joseph A. Gieger

[57] ABSTRACT

A one-way throttling valve for use in the vacuum line of a pneumatic membrane actuator which controls the combustion air temperature of a carburetor-euipped internal combustion engine by means of an air flow proportioning flapper admitting cold raw air and/or preheated raw air into a duct junction upstream of the intake filter, the throttling valve having a tiny throttling orifice which remains open, while the throttling valve itself is closed, thereby delaying the removal of negative pressure from the pneumatic actuator. The one-way throttling valve may be arranged in one of the two vacuum line connectors of the valve housing of a thermostat relief valve.

6 Claims, 4 Drawing Figures

U.S. Patent  Mar. 24, 1981  4,257,380
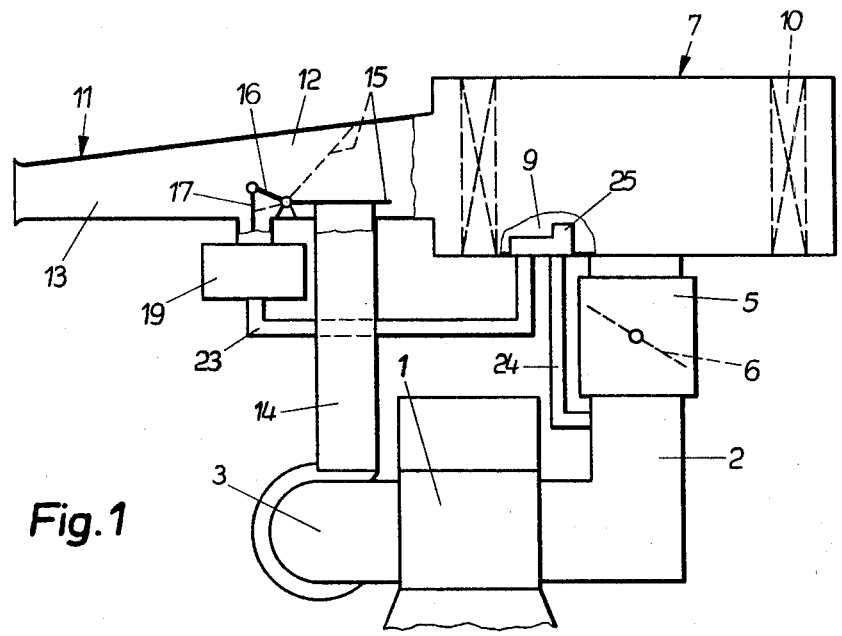
Fig.1
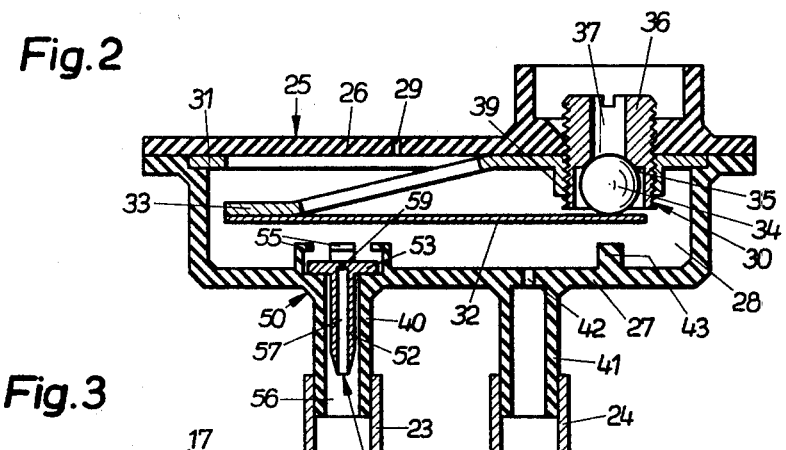
Fig.2
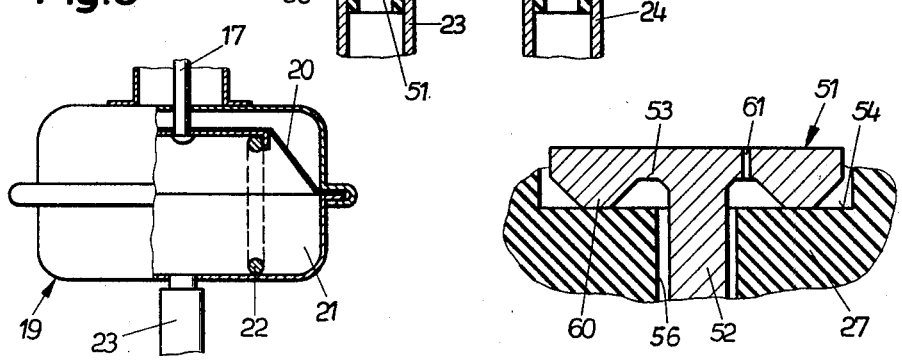
Fig.3
Fig.4

ONE-WAY THROTTLING VALVE FOR PNEUMATIC MEMBRANE ACTUATOR IN ENGINE AIR INTAKE SYSTEM

BACKGROUND OF THE INVENTION

1. Field of the Invention

The present invention relates to air intake systems for carburetor-equipped internal combustion engines, and, more particularly, to an air intake system which is designed to automatically control the combustion air temperature by means of a flapper valve that mixes cold raw air with preheated raw air, the flapper position being continuously adjustable by means of a pneumatic membrane actuator.

2. Description of the Prior Art

The prior art in the field of air temperature control systems for carburetor-equipped internal combustion engines includes a number of suggestions for resolving the problem of supplying the internal combustion engine with preheated raw air, at a controlled, optimal temperature, especially during cold start of the engine at low ambient temperatures.

Most air intake systems of this kind feature a warm air intake duct through which preheated raw air passes from a so-called exhaust stove to a duct junction in the cold air intake duct, a pivotable flapper being so arranged in the duct junction that, by progressively opening one intake duct while closing the other, it proportions the flows of cold raw air and preheated raw air, for the establishment of the desired raw air temperature. The angular position of the flapper is set by means of a pneumatic membrane actuator which receives negative pressure through a vacuum line which is connected to the air intake manifold of the internal combustion engine, downstream of the carburetor main throttle.

From U.S. Pat. No. 3,726,512 it is known to arrange in the vacuum line between the intake manifold and the pneumatic actuator a temperature-responsive relief valve which is designed to reduce the negative pressure in the vacuum line, when the raw air temperature reaches a certain level. This known thermostat relief valve features a valve housing which is mounted in the clean air space of the air intake filter, with the two vacuum line connections reaching to the outside of the filter housing.

The valve mechanism of this relief valve includes a moving valve element in the form of a ball which cooperates with a relief port, the movement freedom of the ball being controlled by the curvature of a bimetallic member. In the cold state of the thermostat relief valve, the bimetallic member presses the ball against the relief port, so that the full effect of the intake manifold vacuum is transmitted to the pneumatic membrane actuator. As soon as the temperature of the combustion air flowing through the intake filter has reached a predetermined level, the bimetallic member assumes a curvature in which it allows the ball to move away from the relief port, thereby admitting air into the vacuum line and reducing the negative pressure in that line, until an equilibrium is established between the degree to which the negative pressure is reduced by the partial opening of the relief valve and the angular position of the air flow proportioning flapper. If the temperature of the incoming combustion air is above the desired level, the thermostat relief valve opens sufficiently to completely eliminate the negative pressure in the vacuum line, so that the pneumatic membrane acuator and the flapper assume their rest position in which the warm air intake duct is closed and only raw air of ambient temperature is drawn into the air intake filter.

In U.S. Pat. No. 3,830,210, it is further suggested to arrange in the vacuum line, between the thermostat relief valve and the pneumatic membrane actuator, a temperature-responsive back pressure valve which, for as long as the internal combustion engine is still below its desired operating temperature, prevents the removal of the negative pressure from the pneumatic membrane actuator, thereby maintaining the warm air intake duct open, in spite of the disappearance of the negative pressure downstream of the carburetor, as a result of a change from partial-load operation to full-load operation, for example. A bimetallic member associated with the back pressure valve assures that, as soon as the engine has reached a certain temperature, the action of the back pressure valve is eliminated, so that, under full-load operation, the engine will take in only cold combustion air, for a maximum energy output.

It is further known from the prior art that the thermostat relief valve and the back pressure valve may be arranged inside a common valve housing, in communication with the incoming combustion air in the clean air space of the intake filter, so that the bimetallic members of the two valves respond to the temperature of the combustion air. Because of its simplicity and low cost, this duplex valve has achieved a degree of acceptance in practical automotive applications.

It has now been found, however, that under conditions of rapid changeover from partial-load operation to full-load operation, the internal combustion engine may be subject to malfunction in the form of "hesitation". This condition is particularly prevalent, when, after a time of full-load operation, the engine is operated briefly at partial load, followed by a resumption of full-load operation. The cold air taken in during the initial full-load operation may have cooled off the thermostatic member of the back pressure valve sufficiently to permit closing of the latter, so that the negative pressure created during partial-load operation is maintained in the membrane actuator, long after resumption of the full-load operation. This means that the volumetric efficiency of the engine is lowered, through the intake of preheated air, until the bimetallic member of the back pressure valve responds to that preheated air by inactivating the back pressure valve.

Other temperature-responsive arrangements of the back pressure valve, using the temperature of the engine cooling system, or of the engine exhaust system, for example, have been found to be too complex and costly for mass production and automotive application.

SUMMARY OF THE INVENTION

Underlying the present invention is the objective of providing an improved duplex valve which, while maintaining the advantages of simplicity and low cost, eliminates the aforementioned operational shortcomings.

The present invention proposes to attain this objective by suggesting a duplex valve arrangement which comprises the known thermostat relief valve, in combination with a one-way throttling valve, the latter taking the place of the previously employed back pressure valve.

The proposed novel one-way throttling valve is no longer responsive to temperature changes, but features a floating throttle member which has a tiny throttling orifice across its body and cooperates with a valve seat in such a way that it opens a large flow passage in one direction of air flow, while restricting the oppositely directed air flow to the tiny throttling orifice. This one-way throttling valve thus permits a rapid establishment of negative pressure in the membrane actuator, while introducing a predetermined time delay in the removal of that negative pressure, whenever the engine is switched to full-load operation.

In a preferred embodiment of the invention, the one-way throttling valve features a simple headed plunger which is floatingly arranged inside one of the two vacuum line connectors of the valve housing, the calibrated throttling orifice being a short axial bore which leads into a larger longitudinal center bore of the plunger shaft, or a short axial bore which is located radially between the plunger shaft and a peripheral flange portion of the plunger head.

In a preferred embodiment of the invention, the throttling orifice of the one-way throttling valve is of such a size that it will take between five and ten seconds for the removal of the negative pressure from the pneumatic membrane actuator, following disappearance of the negative pressure in the vacuum line leading to the engine intake manifold. The flow cross section of the open throttling valve, in contrast, allows for the buildup of negative pressure in the control pressure space of the membrane actuator in less than one second.

BRIEF DESCRIPTION OF THE DRAWING

Further special features and advantages of the invention will become apparent from the description following below, when taken together with the accompanying drawing which illustrates, by way of example, a preferred embodiment of the invention, represented in the various figures as follows:

FIG. 1 shows, in a schematic representation, an arrangement of an air intake system for a carburetor-equipped internal combustion engine, incorporating, as part of a duplex valve, a one-way throttling valve in the vacuum line of the pneumatic membrane actuator;

FIG. 2 shows, at an enlarged scale and longitudinally cross-sectioned, the novel duplex valve of the air intake system of FIG. 1;

FIG. 3 shows, likewise at an enlarged scale and partially cross-sectioned, the pneumatic membrane actuator of the air intake system of FIG. 1; and FIG. 4 shows a further enlarged modified detail of the one-way throttling valve which is shown in FIG. 2.

DESCRIPTION OF THE PREFERRED EMBODIMENT

Referring to FIG. 1 of the drawing, the internal combustion engine 1 has arranged on opposite sides thereof an intake manifold 2 and an exhaust manifold 3, the intake manifold 2 carrying a carburetor 5 with a pivotable main throttle 6. The carburetor 5, in turn, carries an air intake filter 7 with an annular filter element 10 surrounding a clean air space 9 above the carburetor 5. The combustion air for the internal combustion engine 1 flows radially inwardly across the filter element 10 into the clean air space 9, and from there into the carburetor 5.

On one side of the air intake filter 7 is arranged a horizontally extending air intake snorkel 11, consisting of successive duct portions which serve as a cold air intake duct 13 and a raw air mixing duct 12, with an intermediate duct junction, where a warm air intake duct 14 leads into the air intake snorkel 11. The warm air intake duct 14 supplies preheated raw air which has received its heat from the exhaust manifold 3 while flowing through an exhaust stove surrounding the exhaust manifold 3.

Inside the air intake snorkel 11, just upstream of the place where the warm air intake duct 14 opens into the duct junction, is arranged a pivotable flapper 15 with a pivot arm 16 to which is connected the drive rod 17 of a pneumatic membrane actuator 19. This actuator, which is shown in greater detail in FIG. 3, has a rubber membrane 20 stretching across an enclosed housing, thereby forming a control pressure space 21 below the membrane 20. An actuator return spring 22 tends to push the membrane 20 and the connected drive rod 17 into the upper rest position in which the flapper 15 closes off the mouth of the warm air intake duct 14 (FIG. 1).

Two interconnected vacuum lines 23 and 24 lead from the control pressure space 21 of the actuator 19 to the engine intake manifold 2, just downstream of the main throttle 6 of carburetor 5. The negative pressure created by the air throttling action of the carburetor main throttle 6 can thus be transmitted to the control pressure space 21 of actuator 19, so that the rubber membrane 20 is pulled downwardly, against the bias of the actuator return spring 22, thereby pivoting the flapper 15 from its horizontal position, in which it admits only cold raw air into the raw air mixing duct 12, to an upwardly pivoted position—shown by dotted lines—in which preheated raw air is admitted, while the flow of cold raw air is restricted or completely shut off.

The vacuum lines 23 and 24 which supply the membrane actuator 19 with negative pressure from the intake manifold 2 are interconnected by a duplex valve (FIG. 2) which, as can be seen in FIG. 1, is mounted in the clean air space 9 of the air intake filter 7 in such a way that its two vacuum line connectors 40 and 41 protrude to the outside of the filter housing. The novel duplex valve of the present invention consists essentially of a closed valve housing 25 which is composed of an upper housing half 26 and a lower housing half 27. The two housing halves are joined along appropriate peripheral clamping flanges.

In the upper housing half 26 is arranged a known thermostat relief valve 30 (see, for example, U.S. Pat. No. 3,726,512) which consists of a spherical valve member 34 and a threaded valve sleeve 36 with a valve seat 35 and a central relief passage 37. The valve member 34 is held in place by means of a flat bimetallic member 32 which is attached to a supporting tongue 33 of a metallic frame 31. The latter is clamped between the two clamping flanges of the two housing halves. The frame 31 has a downwardly protruding threaded collar 39 with which it supports the threaded valve sleeve 36 in an adjustable arrangement. A protruding stop 43 on the wall of the lower housing half 27 limits the relief movement of the bimetallic member 32, in order to prevent the valve member 34 from falling out of the valve sleeve 36. The housing halves themselves are preferably injection molded and permanently sealed together by means of an adhesive bond or a peripheral weld.

The operation of the thermostat relief valve 30 is known from the prior art, responding to an increase in the air temperature above a predetermined level by an increase in the downward curvature of the bimetallic member 32 which then permits a corresponding movement of the valve member 34 away from its valve seat 35, so that air from the clean air space 9 is allowed to enter the interior space 28 of the valve housing 25, thereby reducing or eliminating the negative pressure which may have been present in the valve space 28. A calibrated orifice 22 in the vacuum line connector 41 allows for the transmission of negative pressure from the engine intake manifold 2 to the valve space 28, via the vacuum line 24. A much smaller inlet opening 29 draws air from the clean air space 9 into the valve housing 25, thereby continuously adjusting the temperature inside the valve housing 25 to that of the incoming raw air. Because the inlet opening 29 is considerably smaller than the calibrated orifice 42, its pressure relieving action is negligible.

The vacuum line connector 40 for the vacuum line 23 is similar to the vacuum line connector 41. However, inside its connecting passage 56 is received a throttle plunger 51 which forms part of a one-way throttle valve 50. The throttle plunger 51 is essentially a mushroom-shaped member, having a hollow shaft portion 52 and an enlarged head portion 53, the latter cooperating with a recessed valve seat 54 which surrounds the opening of the connecting passage 56 into the valve housing 25. The throttle plunger 51 is arranged in a floating relationship with respect to its valve seat 54. Four flexible retaining noses 55 limit the opening movement of the throttle plunger, while allowing initial forcible insertion of the plunger past these noses. An axial bore 57 in the shaft portion 52 of plunger 51 leads to a short tiny throttling orifice 59 in the plunger head portion 53.

The plunger 51 of the one-way throttle valve 50 thus permits a rapid transmission and buildup of negative pressure in the control pressure space 21 of the actuator 19, by moving away from its valve seat 54, as air flows freely from the vacuum line 23 into vacuum line 24. But, the plunger 51 limits the air flow in the opposite direction to the cross section of the throttling orifice 59, thereby slowing the admission of air to the pressure space 21 of actuator 19 and accordingly delaying the elimination of the negative pressure in the actuator.

FIG. 4 shows a modified arrangement of a throttling orifice in the throttle plunger 51, the latter having a full shaft portion 52 which forms an annular flow space with the connecting passage 56 of the vacuum line connector 40. The modified throttling orifice 61 is arranged radially between the plunger shaft portion 52 and a peripheral flange portion 60 of the plunger head portion 53, the flange portion 60 thereby serving as an annular valve member in cooperation with the recessed valve seat 54.

In both cases, the flow cross section of the throttling orifice, 59 or 61, respectively, is approximately fifty times smaller than the smallest flow cross section of the fully open throttling valve 50, as determined by the annular clearance between the connecting passage 56 and the plunger shaft portion 52. This flow cross section is also approximately equal to the flow cross section of the calibrated orifice 42. Satisfactory results have been achieved with a duplex valve arrangement in which the throttling orifice 59 or 61, respectively, has a cross section of 0.015 mm$^2$ area, and the open throttle valve and calibrated orifice 42 have approximately identical flow cross sections of 0.75 mm$^2$ area.

In operation, the internal combustion engine creates varying levels of negative pressure inside its intake manifold 2, as a result of the angular position of its carburetor main throttle 6. The negative pressure is highest, when the throttling action is the greatest, i.e. when the engine is operating under partial load, but at high speed, as in a moving motor vehicle, when the accelerator pedal is completely released and the engine exerts a braking action on the vehicle. The negative pressure inside the intake manifold 2 is lowest, on the other hand, when the engine operates under full load, i.e. when the carburetor main throttle 6 is oriented vertically.

When the engine undergoes startup from the cold condition, and especially when the ambient temperature is low, it is important that the combustion air which is drawn into the carburetor is preheated, for better carburetion and for a more rapid engine warmup. This is achieved by the action of the flapper 15 and its connected pneumatic membrane actuator 19 which, via the vacuum lines 23 and 24, receives negative pressure from the intake manifold 2, thereby opening the warm air intake duct 14, while closing the cold air intake duct 13. Responding to the low temperature of the incoming air, the thermostat relief valve 30 assumes a closed position, so that the full effect of the negative pressure is transmitted to the membrane actuator 19. As the engine exhaust manifold 3 becomes progressively hotter, and progressively warmer air reaches the clean air space 9 of the air intake filter 7 and, from there, flows through the opening 29 into the valve housing 24, the bimetallic member 32 curves downwardly, thereby opening the relief valve 30. The resultant reduction in the negative pressure inside the control pressure space 21 of actuator 19 will reposition the flapper 15 to an angle at which the mixture of cold and preheated raw air has the desired optimal temperature.

Assuming now that the carburetor main throttle 6 is rotated to a vertical, or nearly vertical orientation, so that the internal combustion engine is subjected to full-load operation, while the negative pressure in the engine intake manifold 2 is lowest, then the one-way throttling valve 50 enters into action, by preventing the immediate removal of the negative pressure from the membrane actuator 19. Accordingly, the flapper 15 is not immediately closed against the warm air duct 14, but moves to that position very slowly. An abrupt switchover from warmer intake air to a high volume of cold air would be detrimental to the proper operation of the carburetor. The throttling valve 50 delays the removal of the negative pressure from the actuator 19, to last between five and ten seconds, thereby producing a smooth transition to full-load operation. For extended full-load operation, it is generally desirable to use only cold raw air, in order to maximize the volumetric efficiency of the engine, for a maximum engine output. Obviously, this volumetric efficiency is higher, when the combustion air is colder.

Full-load operation with comparatively cold raw air, on the other hand, will cause the thermostat relief valve 30 to close its relief passage 37, so that, when the carburetor main throttle 6 is rotated into a position for partial-load operation, the resulting negative pressure in the engine intake manifold 2 is immediately transmitted to the membrane actuator 19—the throttle valve 50 having opened and the relief valve 30 remaining closed—with the result that the flapper 15 is pivoted upwardly for the intake of preheated raw air. A quick return to full-load operation will not immediately cause the reclosing of the warm air intake duct 14, but the one-way throttling valve 50 will again delay the flapper return movement by several seconds.

The prior art duplex valve, in contrast, would have completely blocked the flapper return movement, delaying it until the warmer air reaches the bimetallic member of the back pressure valve which then opens the valve, returning the actuator and flapper to their rest position in which only cold air is taken into the air intake system. The novel one-way throttling valve thus offers an optimal compromise solution between the total absence of a delayed flapper return movement and an excessively delayed flapper return movement, at the beginning of full-load operation of the internal combustion engine.

While the present invention proposes to arrange the throttling orifice in the form of a tiny bore which extends through the body of the throttle plunger, it is of course also possible to arrange such a throttling passage in the recessed valve seat, or even elsewhere in the vacuum line, so long as the throttling orifice bypasses the closed throttling valve to the clean air space of the intake filter. It is also thinkable, on the other hand, to use raw air to reduce the negative pressure in the pneumatic membrane actuator, in which case the throttling orifice could be arranged in conjunction with the actuator membrane itself. Obviously, this alternative carries with it the risk of obstructing the throttling orifice with airborne particles.

It should be understood, of course, that the foregoing disclosure describes only a preferred embodiment of the invention and that it is intended to cover all changes and modifications of this example of the invention which fall within the scope of the appended claims.

We claim the following:

1. In a device for controlling the combustion air temperature of an internal combustion engine which is equipped with a carburetor in its air intake system and an air filter upstream of the carburetor, which device has intake ducts for cold raw air and preheated raw air leading to a duct junction upstream of the air filter and, associated with the duct junction, a continuously adjustable air flow proportioning valve which controls the relative flows of cold and preheated raw air that are admitted into the duct junction, said valve being driven by a spring-loaded pneumatic actuator which receives negative pressure through a vacuum line connecting it to a point downstream of the carburetor main throttle, in such a device, a valve arrangement in the vacuum line for controlling the transmission of negative pressure to the pneumatic actuator, the valve arrangement comprising in combination:

a pressure relief valve having a relief passage for the admission of a pressure reducing air flow into the vacuum line, a valve member adapted to open and close the relief passage, and a valve control member responding to the temperature of the combustion air flow downstream of the duct junction by maintaining the valve member in its closed position at a low air flow temperature and by allowing it to progressively open the relief passage, as the air temperature rises above a predetermined value, thereby reducing the negative pressure which is transmitted to the actuator and allowing the spring of the latter to readjust the position of the air proportioning valve for the admission of less preheated air; and a one-way throttling valve in that portion of the vacuum line which extends between the pressure relief valve and the pneumatic actuator, the throttling valve including a throttling member and a small throttling orifice, the throttling member being movable between an open position in which it creates a comparatively large flow cross section in the vacuum line, for the unimpeded transmission of negative pressure to the actuator, and a closed position in which it restricts the flow cross section to the small throttling orifice, for the delayed removal of negative pressure from the actuator; and wherein the throttling member has the form of a plunger with an elongated shaft portion and an enlarged head portion on one extremity thereof;

the plunger shaft portion is engaged in an inlet bore portion of the vacuum line, pointing in the flow direction towards the pneumatic actuator;

the plunger head portion cooperates with an annular valve seat which surrounds said inlet bore portion; and the plunger shaft portion and the inlet bore portion cooperate to guide the plunger for axial valve opening and closing movements while defining a comparatively large flow cross section therebetween, at least in the open valve position.

2. A valve arrangement as defined in claim 1, wherein the area of the flow cross section of the throttling orifice is between sixty times and thirty times smaller than the area of the smallest flow cross section of the vacuum line, when the throttling member is in its fully open position.

3. A valve arrangement as defined in claim 1, wherein the pressure relief valve and the one-way throttling valve are arranged inside a common housing, the latter being mounted in the clean air space of the air filter and having two tubular vacuum line connectors extending to the outside of the air filter;

the relief passage of the pressure relief valve leads from said clean air space to the inside of the valve housing;

the valve housing further includes an inlet opening for the admission of a small flow of combustion air from said clean air space to the temperature-responsive control member of the pressure relief valve, the flow cross section of the inlet opening being considerably smaller than the smallest flow cross section of the vacuum line, when the throttling member of the one-way throttling valve is in its fully open position; and the inlet bore portion which is associated with the throttling valve plunger is defined by the vacuum line connector of that portion of the vacuum line which leads to the pneumatic actuator.

4. A valve arrangement as defined in claim 1, wherein the valve housing further includes at least one flexible plunger retaining nose which serves to limit the opening movements of the throttling plunger while being resiliently deformable for the insertion of the plunger shaft portion into the inlet bore portion.

5. A valve arrangement as defined in claim 1, wherein the throttling orifice of the one-way throttling valve is part of a bore which extends axially through the body of the throttling plunger.

6. A valve arrangement as defined in claim 1, wherein the head portion of the throttling plunger includes a peripheral flange portion which cooperates with the valve seat while defining an annular recess between it and the plunger shaft portion; and the throttling orifice of the one-way throttling valve extends from said annular recess axially through the plunger head portion.

* * * * *